W. A. CONDON.
MOTION PICTURE APPARATUS.
APPLICATION FILED JULY 18, 1917.
1,390,763.
Patented Sept. 13, 1921.
4 SHEETS—SHEET 1.
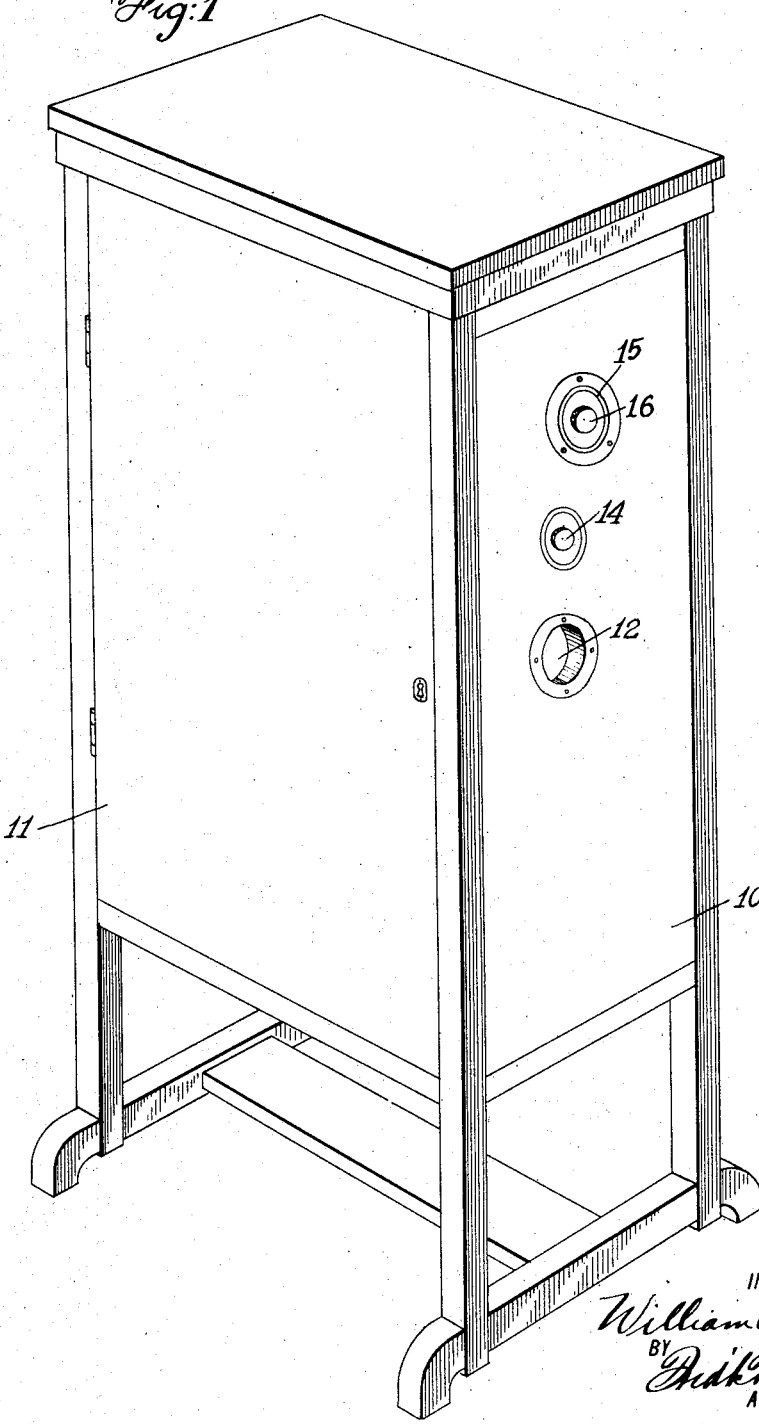

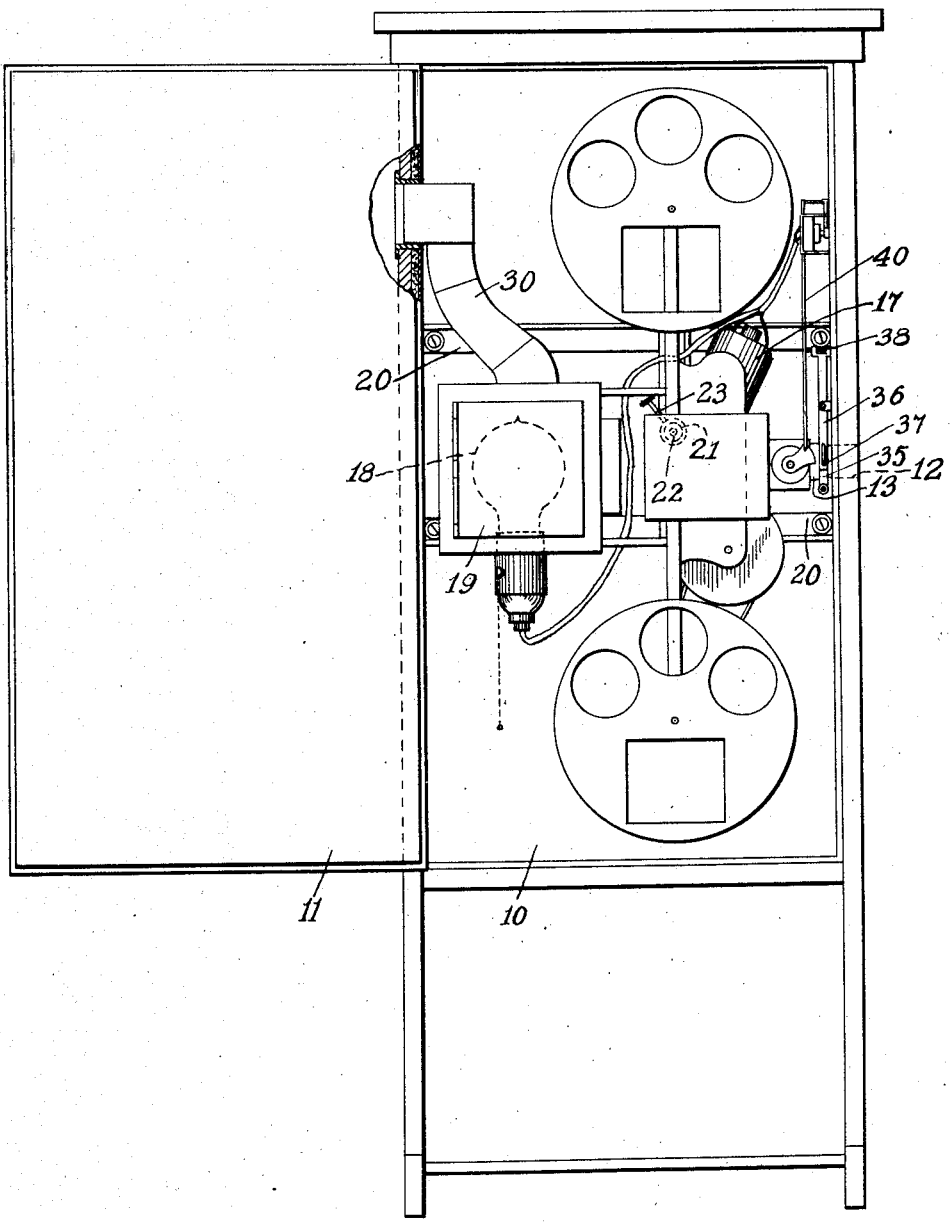

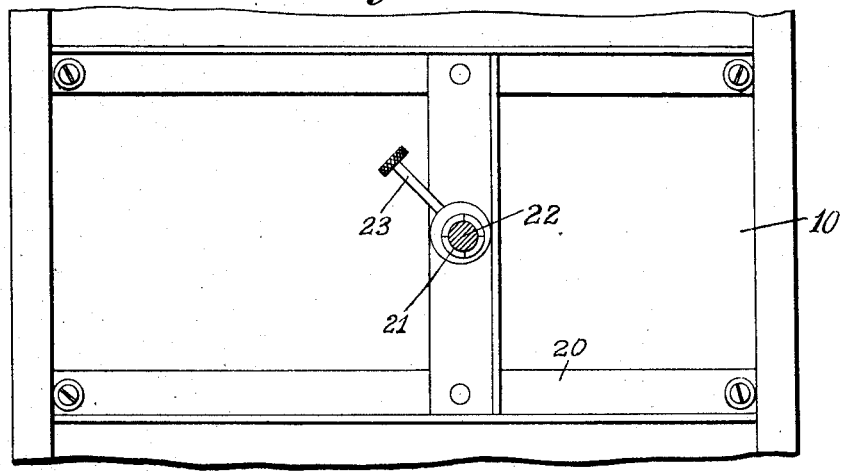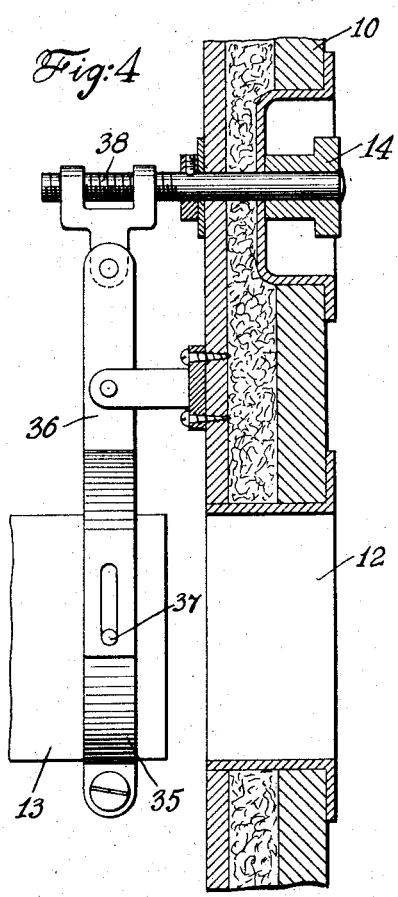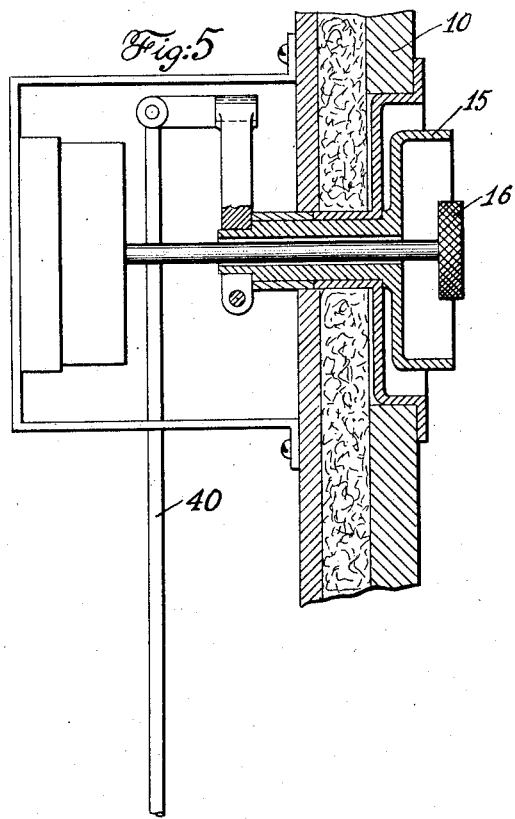

W. A. CONDON.
MOTION PICTURE APPARATUS.
APPLICATION FILED JULY 18, 1917.
1,390,763.
Patented Sept. 13, 1921.
4 SHEETS—SHEET 4.
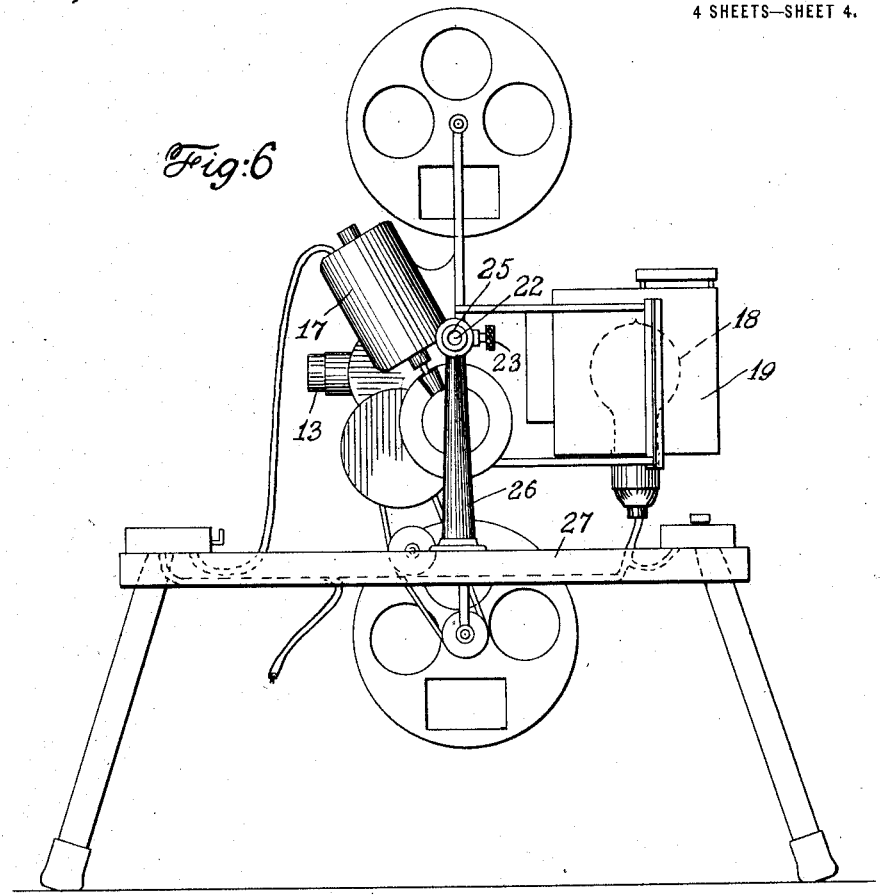
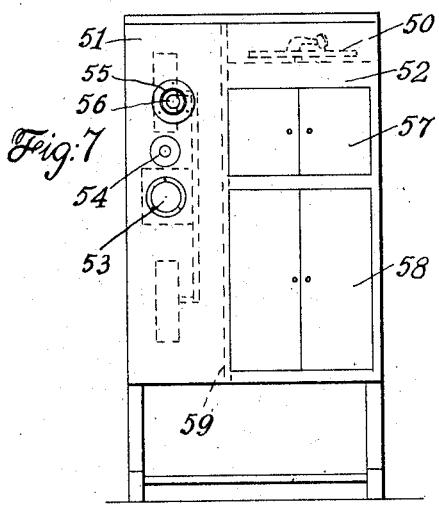
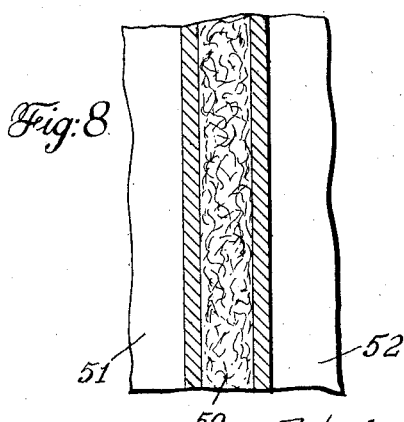
INVENTOR
William A. Condon
BY
ATTORNEY

UNITED STATES PATENT OFFICE.

WILLIAM A. CONDON, OF CHATHAM, NEW JERSEY.

MOTION-PICTURE APPARATUS.

1,390,763.   Specification of Letters Patent.   Patented Sept. 13, 1921.

Application filed July 18, 1917. Serial No. 181,217.

*To all whom it may concern:*

Be it known that I, WILLIAM A. CONDON, a citizen of the United States, and a resident of Chatham, in the county of Morris and State of New Jersey, have invented certain new and useful Improvements in Motion-Picture Apparatus, of which the following is a specification.

The invention relates to motion picture apparatus, and to apparatus of this character more particularly suitable for non- or semi-professional use.

It has for its object to provide a motion picture apparatus which will be simple in operation and adjustment, and compact and inexpensive in construction, also, pleasing in appearance, being suited to the most exacting taste as a piece of furniture, for example for use in the home. A further object of the invention is to so construct and house the apparatus that its operation will be comparatively silent, and, therefore, to permit of the combination therewith, in a single unit, of a talking machine, as well as to operate the latter simultaneously with the former. A still further object of the invention is to provide a stable construction and which will enable the centering of the projected light to be effected without difficulty, and afford a steady projection. The construction, also, permits of the ready removal of the entire motion picture portion of the apparatus from its housing, and its subsequent attachment in convenient and simple manner to a suitable table or the like, in case it should be desired to operate the motion picture apparatus at some distant point to which it would not be practicable to transport the entire cabinet.

The nature of the invention will be best understood when described in connection with the accompanying drawings, in which—

Figure 1 shows in perspective the improved motion picture apparatus as retained in a cabinet.

Fig. 2 is a side elevation of the cabinet with door opened to display the mechanism, and a portion shown in section.

Fig. 3 is a detail side view of the frame for mounting the motion picture mechanism.

Figs. 4 and 5 are detail views illustrating, respectively, the focusing mechanism and the framing mechanism, the latter showing, also, a switch for controlling an electric circuit.

Fig. 6 illustrates the motion picture mechanism removed from the cabinet and mounted upon a suitable table or support.

Fig. 7 is a front elevation of a combined motion picture and talking machine cabinet.

Fig. 8 is a fragmentary detail view showing the sound-proof partition between the two cabinets.

Similar characters of reference designate corresponding parts throughout the several views.

Referring to the drawings, 10 designates a cabinet of any well-known or special construction, designed to house the motion picture machine, shown in Figs. 2 and 6, and which may be of any well-known or special construction. The said cabinet is provided with a hinged door 11 to permit of access to same and, also, to allow of the removal of the entire motion picture machine, as well as to render the apparatus comparatively silent when the motion pictures are being projected. The front panel of the cabinet is provided with a projection aperture 12 through which the motion pictures are adapted to be projected upon a screen (not shown), said aperture being of sufficient size to allow of adjustment of the projecting lens 13 of the motion picture apparatus relatively thereto in order to accommodate the various situations met with. In addition to the projection aperture 12, the front panel of the cabinet is provided with a finger piece 14 which projects to the outside of said cabinet and is employed for focusing the said lens 13. Finger pieces 15 and 16 are also provided on the panel and are adapted, respectively, to frame the picture and to control the electric circuit for operating a motor 17 which actuates the motion picture machine, as well as to light a lamp 18 mounted in a suitable lamphouse 19 attached to the machine.

This machine, as a unit, is removably mounted at the side of the cabinet 10 opposite the door 11; and for this purpose, there is secured, for example to said side, a frame or spider 20 having a suitable sleeve 21 projecting therefrom at right angles to said side and into the cabinet. This sleeve 21 is adapted to receive a stud 22 upon which is carried the entire motion picture machine, the mounting being preferably such that the axis of said stud passes through the center of gravity of the machine. The same is then capable of being readily slipped into said sleeve and may be positively secured thereto by means of a set screw 23. By thus adjustably and removably securing said motion picture machine to the cabinet, it is possible to adjust the position of its lens 13 relatively to the aperture 12 to accommodate the apparatus to various conditions met with; and it has been found that a much less motion is required to accomplish the centering of the projected light upon the screen (not shown) in this instance than in the case when the base of the machine is mounted upon a table or platform which is made adjustable. Moreover, the adjustment is more readily effected than in the case of a table support and the entire apparatus is in a more stable condition, whereby a steady projection is possible.

Furthermore, should it be desired to transport the machine or to use the same at some distant point to which it would not be convenient or practicable to carry or to locate the entire cabinet, set screw 23 as well as the framing and focusing means, hereinafter described, may be unloosened, and the electrical connections to the motor disconnected; whereupon, the entire mechanism may be withdrawn from the sleeve 21 and mounted within a similar sleeve 25 of a standard 26 which is mounted, for example, on a table 27, Fig. 6.

When the machine is in the cabinet, as shown in Fig. 2, it is usually necessary, or at least highly desirable, to provide a chimney or stack 30 extending from the lamphouse 19 through the back wall of the cabinet in order to furnish an outlet for the heated air of the lamphouse. The flue 30 is, therefore, made in several sections to telescope with reference to one another in order to accommodate the movement of the mechanism within the sleeve 21.

In order to effect the focusing of lens 13, which is located immediately behind the aperture 12, the said lens is arranged to move back and forth, for example in the following manner, reference being had more particularly to Fig. 4 of the drawings. A band or collar 35 surrounds the lens casing 13 and one end of a slotted lever 36 is caused to engage a pin 37 thereof, the other end being designed to be moved inwardly or outwardly in accordance with the rotation of screw 38, whose operative end extends exteriorly of the cabinet, terminating in the finger piece 14.

To effect the framing of the picture of the film, suitable connection is made to the outside of the front panel as through a lever 40, which is arranged to be rocked through rotation of the finger piece 15 extending to the outside of the cabinet and connected therewith.

In this manner, the entire motion picture machine may be concealed within the cabinet and all of the operations, save the positioning of the reels and threading of the film, are effected from the outside of the cabinet and without in any way disturbing the operation of the apparatus. The construction, furthermore, provides for a neat and attractive cabinet and for a substantially noiseless operation of the device. This makes possible, also, the combination of the motion picture machine with a talking machine 50, both being arranged in a cabinet 51 by adding another compartment 52 for the latter and adjacent to that containing the motion picture machine, Fig. 7. This cabinet is provided, similarly, with an aperture 53, focusing member 54, framer 55 and switch control 56. For the talking machine 50, a suitable opening, as by means of doors 57, is provided in the compartment 52 through which the sound waves emitted by the said machine 50 are delivered, and a storage portion 58 is arranged below said doors. The two sections of the cabinet are separated by a sound-proof partition 59, shown in detail in Fig. 8; and the operation of the two devices simultaneously produces a very pleasing and satisfactory effect.

I claim:

1. The combination with a cabinet of the portable type and provided with a projection aperture; of a motion picture machine inclosed by said cabinet, forming a unit therewith and movably retained therein to oscillate in a vertical plane for the purpose of positioning the lens of said machine relatively to said aperture to properly center the light projected therethrough.

2. The combination with a cabinet of the portable type and provided with a projection aperture; of a motion picture machine inclosed by said cabinet, forming a unit therewith and pivoted thereto to oscillate in a vertical plane for the purpose of positioning the lens of said machine relatively to said aperture to properly center the light projected therethrough.

3. The combination with a cabinet of the portable type and provided with a projection aperture; of a motion picture machine inclosed by said cabinet, forming a unit therewith and pivoted thereto to oscillate in a vertical plane substantially about its center of gravity and relatively to said projection aperture for the purpose of positioning the lens of said machine relatively to said aperture to properly center the light projecting therethrough.

4. The combination with a cabinet of the portable type provided with a projection aperture, and a frame secured to said cabinet and inclosed thereby; of a motion picture machine pivotally retained by said frame to oscillate in a vertical plane for the purpose of positioning said machine relatively to said aperture to properly center the light projected therethrough.

5. The combination with a cabinet of the portable type and provided with a projection aperture, a frame retained thereby and inclosed by said cabinet and a sleeve projecting from said frame into the cabinet; of a motion picture machine, a stud upon which the same is adapted to be carried, said stud being adapted to fit within the said sleeve to permit the machine to oscillate in a vertical plane relatively to said aperture for the purpose of positioning the lens of said machine relatively to said aperture to properly center the light projected therethrough and means to lock said stud to said sleeve.

6. The combination with a cabinet of the portable type and provided with a projection aperture, a frame retained by said cabinet and inclosed thereby, and a sleeve projecting from said frame into said cabinet; of a motion picture machine and a stud being adapted to be fitted within said sleeve to permit the machine to oscillate in a vertical plane relatively to said aperture for the purpose of positioning the lens of said machine relatively to said aperture to properly center the light projected therethrough and a set screw to lock said stud to said sleeve.

7. The combination with a cabinet provided with a projection aperture; of a motion picture machine supported on the cabinet to position the lens of said machine relatively to said aperture for the purpose of properly centering the projected light; a lamphouse movable with said motion picture machine relatively to the cabinet; and a stack extending from said lamphouse to the outside of the cabinet and movable relatively to said cabinet.

8. The combination with a cabinet provided with a projection aperture; of a motion picture machine supported on the cabinet to position the lens of said machine relatively to said aperture for the purpose of properly centering the projected light; a lamphouse movable with said motion picture machine relative to the cabinet; and a stack extending from said lamphouse to the outside of the cabinet and flexibly connected to said lamphouse.

9. The combination with a cabinet provided with a projection aperture; of a motion picture machine movably retained therein to position the lens of said machine relatively to said aperture for the purpose of properly centering the projected light; a lamphouse movable with said motion picture machine; and a telescopic stack connected to said lamphouse and extending to the outside of the cabinet.

10. The combination with a cabinet provided with a projection aperture; of a motion picture machine inclosed by said cabinet and supported on the cabinet to oscillate in a vertical plane to position the lens of said machine relatively to said aperture for the purpose of properly centering the light projected through the aperture; and means accessible from the outside of said cabinet and flexibly connected with the projecting lens of said motion picture machine to focus the same.

11. The combination with a cabinet provided with a projection aperture; of a motion picture machine inclosed by said cabinet and movably retained therein to position the lens of said machine relatively to said aperture for the purpose of properly centering the light projected through the aperture; a band surrounding the lens of said motion picture machine; a lever fulcrumed to the cabinet, one end thereof engaging said band; and means extending to the outside of said cabinet to engage the other end of said lever and move same to properly focus the lens.

12. The combination with a cabinet provided with a projection aperture; of a motion picture machine inclosed by said cabinet and supported on the cabinet to oscillate in a vertical plane to position the lens of said machine relatively to said aperture for the purpose of properly centering the light projected through the aperture; and means accessible from the outside of said cabinet and flexibly connected to said machine whereby the film of said motion picture machine may be properly framed with reference to the film aperture.

13. The combination with a cabinet provided with a projection aperture; of a motion picture machine inclosed by said cabinet and movably retained therein to position the lens of said machine relatively to said aperture for the purpose of properly centering the light projected through the aperture; the framing mechanism of said motion picture machine, a lever extending therefrom and fulcrumed to said cabinet; and a rotatable sleeve extending through the front wall of said cabinet and terminating exteriorly thereof in a suitable hand piece for rotation, said sleeve being adapted to engage the said lever to actuate the said framing mechanism.

14. The combination with a cabinet provided with a projection aperture; of a motion picture machine inclosed by said cabinet and movably retained therein to position the lens of said machine relatively to said aperture for the purpose of properly centering the light projected through the aperture; the framing mechanism of said motion picture machine, a lever extending therefrom and fulcrumed to said cabinet; a rotatable sleeve extending through the front wall of said cabinet and terminating exteriorly thereof in a suitable hand piece for rotation, said sleeve being adapted to engage the said lever to actuate the said framing mechanism; a shaft extending through said sleeve; an electric switch at the inner end thereof within said cabinet; and a suitable finger piece exterior to the cabinet for operating said switch.

Signed at New York in the county of New York and State of New York this 17 day of July, A. D. 1917.

WM. A. CONDON.